United States Patent [19]

Griewahn

[11] Patent Number: 5,337,932

[45] Date of Patent: Aug. 16, 1994

[54] MULTILEVEL BICYCLE RACK FOR MOTOR VEHICLES

[76] Inventor: Gary L. Griewahn, 1268 E. First St., Adrian, Mich. 49221

[21] Appl. No.: 897,696

[22] Filed: Jun. 12, 1992

[51] Int. Cl.$^5$ .......................... B60R 9/00; B60R 11/00
[52] U.S. Cl. ...................... 224/42.03 B; 224/42.45 R; 224/42.03 A
[58] Field of Search ............ 224/273, 42.03 R, 42.06, 224/42.03 A, 42.07, 42.03 B, 42.13, 42.45 R, 42.44; 211/5, 17, 18, 19, 22; 296/37.1, 37.2, 37.6; 414/462

[56] References Cited

U.S. PATENT DOCUMENTS

| | | | |
|---|---|---|---|
| 3,876,123 | 4/1975 | Stuntz | 224/42.03 B |
| 3,921,869 | 11/1975 | Rogers | 224/42.03 B |
| 4,116,341 | 9/1978 | Hebda | 211/17 |
| 4,298,151 | 11/1981 | O'Connor | 224/329 |
| 4,301,953 | 11/1981 | Abbott | 224/42 |
| 4,676,414 | 6/1987 | Deguevara | 224/42.03 B X |
| 4,804,120 | 2/1989 | Kraklio | 224/42 |
| 4,856,686 | 8/1989 | Workentine | 224/42.03 B X |
| 4,936,480 | 6/1990 | Apostolo | 224/42.03 A X |
| 5,067,641 | 11/1991 | Johnson et al. | 224/42.03 R X |
| 5,181,822 | 1/1993 | Allsop et al. | 224/42.03 B X |

FOREIGN PATENT DOCUMENTS 2642024  7/1990  France .......................... 224/42.03 B

OTHER PUBLICATIONS

IMS Enterprises Ad. American Bicyclist and Motorcyclist, Jan. 1991.
Joe's Racks Ad. American Bycyclist and Motorcyclist, Jan. 1991.

*Primary Examiner*—Glenn T. Barrett
*Attorney, Agent, or Firm*—James M. Deimen

[57] ABSTRACT

A multilevel bicycle rack comprising a pair of vertical supports having two pair of rearwardly extending arms to support a plurality of bicycles or, optionally, bicycles in combination with other items. A pair of diagonal cross braces extend upwardly from attachment to the opposite side of the bumper from the attachment of the pair of vertical supports. A third vertical support extends upwardly to a forward extension of the upper arms with the upper arms and diagonal braces attached to the pair of vertical supports toward the top of the vertical supports. Despite the fact that the upper pair of rearwardly extending cantilevered arms are 12 to 15 times the bumper thickness above the bumper no additional attachment connections to the motor vehicle are needed above the bumper to counter the cantilevered loading of the arms.

11 Claims, 5 Drawing Sheets

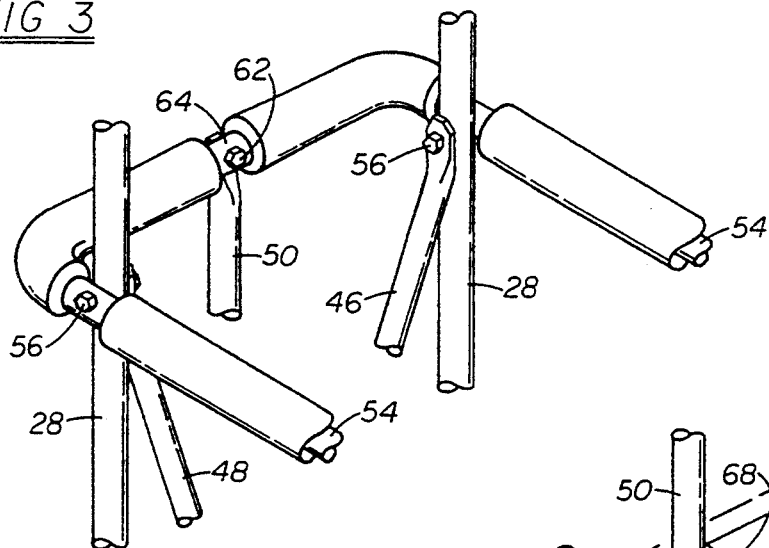
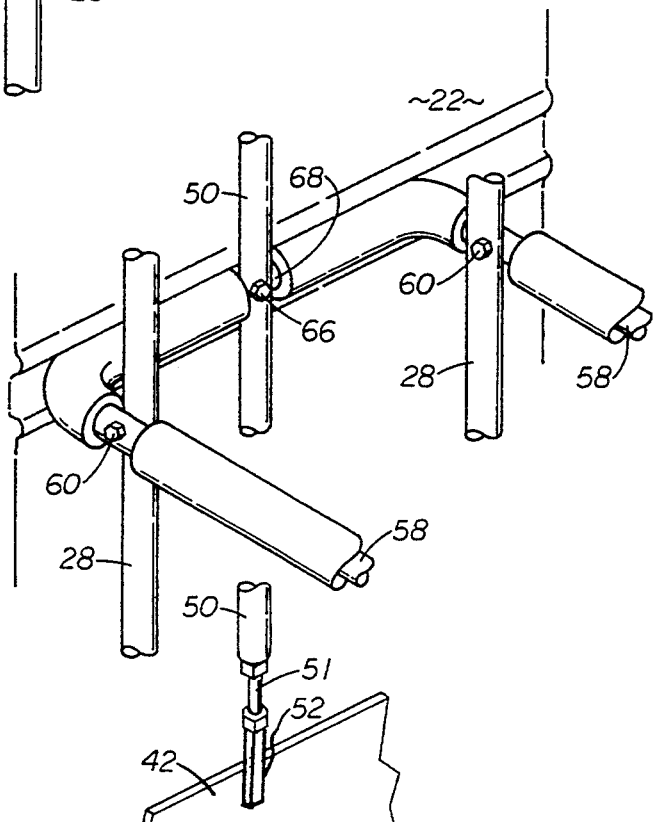
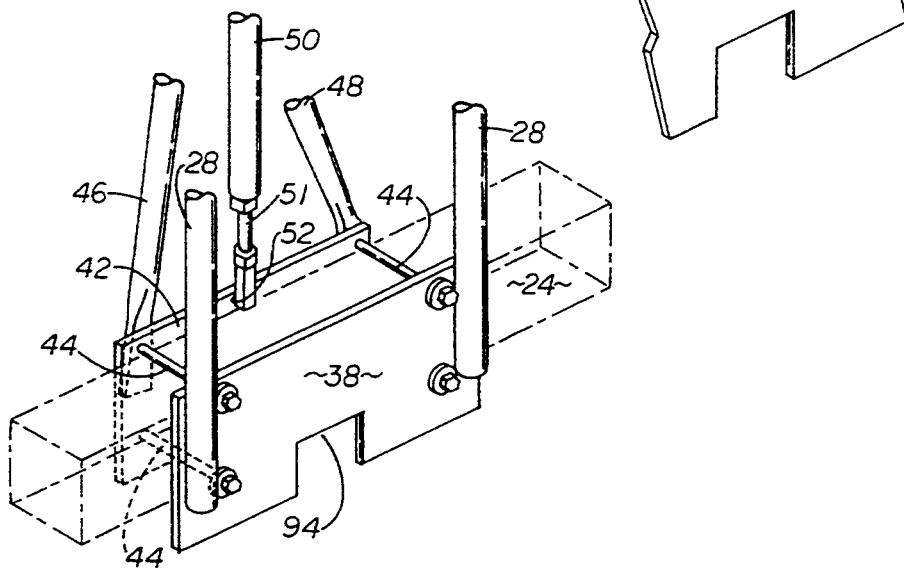

MULTILEVEL BICYCLE RACK FOR MOTOR VEHICLES

BACKGROUND OF THE INVENTION

The field of the invention pertains to racks for supporting bicycles and other items on the exterior of a vehicle and, in particular, to racks for carrying several bicycles with or without several other items.

Single level bicycle racks for carrying one or more bicycles on the back or front of a motor vehicle are well known. An example of a single level rack is disclosed in U.S. Pat. No. 4,298,151 wherein a variety of attachment devices are also disclosed to attach the rack to a variety of motor vehicles.

U.S. Pat. No. 4,804,120 discloses a two level rack for carrying four partially disassembled bicycles. The rack carries the upper set of two bicycles above the trunk lid of a sedan. Such a configuration is not applicable to motor vehicles such as vans, motor homes, travel trailers and station wagons which have a high vertical back end.

U.S. Pat. No. 4,301,953 discloses attachment means on a trailer hitch plate to support a single level bicycle rack. A vertical socket attachment and two horizontal socket attachments are shown.

A single level bicycle rack that may be either installed on a motor vehicle or installed in a building is disclosed in U.S. Pat. No. 4,116,341. Installed in a building the rack includes a pivot to permit the rack and a bicycle there attached to be swung up into a horizontal position adjacent the building ceiling.

Two bilevel bicycle racks for in-building use are illustrated in advertisements. In the January 1991 issue of American Bicyclist and Motorcyclist, IMS Enterprises, Inc., Wichita, Kans. offers a floor to ceiling post with forks extending therefrom to support the bicycles. In the same issue a free standing wooden rack is offered by Joe's Racks on pages 44 and 59. These bilevel bicycle racks do not lend themselves to conversion for motor vehicle use because of the ceiling support in the former and the large base in the latter.

SUMMARY OF THE INVENTION

Applicant has invented a multilevel bicycle rack for six or more bicycles or a combination of bicycles and other items typically carried on a family camping trip or other outdoor excursion. Thus, the new rack can easily carry a gas fired grill or a large cargo box in combination with several bicycles.

The rack attaches securely to the box section rear bumper of a large travel trailer or to a class three hitch on a van or motor home. The rack comprises a pair of vertical supports attached to the rear of the rear bumper and a pair of diagonal cross braces extending upwardly from attachment to the front of the rear bumper. A third vertical support extends from the front of the rear bumper to a cross bar toward the top of the rack. Two pair of padded arms extend rearwardly from the pair of vertical supports to provide support for the bicycles or other items. Two tested prototypes of the rack have shown that additional attachment of the rack above the bumper attachments are not necessary with a 3 inches or more square steel rear travel trailer bumper despite the severe cantilevered loading of the rack.

In an alternate version the bicycle rack is equipped with a "pseudo-bumper" attachment for a Class 3 hitch. The rack is mounted to the pseudo-bumper which in turn is rigidly attached to the removable ball carrying extension of the Class 3 hitch.

Optional fittings for the rack include a large cargo box and a spare tire carrier. Despite the inclusion of a gas grill, cargo box or spare tire carrier, the rack can still carry four or more bicycles instead of the six or more bicycles absent one of the other items.

DESCRIPTION OF THE DRAWINGS

FIG. 3 is a detail in perspective of the attachment of the upper arms to the rack;

FIG. 4 is a detail in perspective of the attachment of the lower arms to the rack;

FIG. 5 is a detail in perspective of the attachment of the rack to a square rear bumper;

DESCRIPTION OF THE PREFERRED EMBODIMENTS

Figure 1:
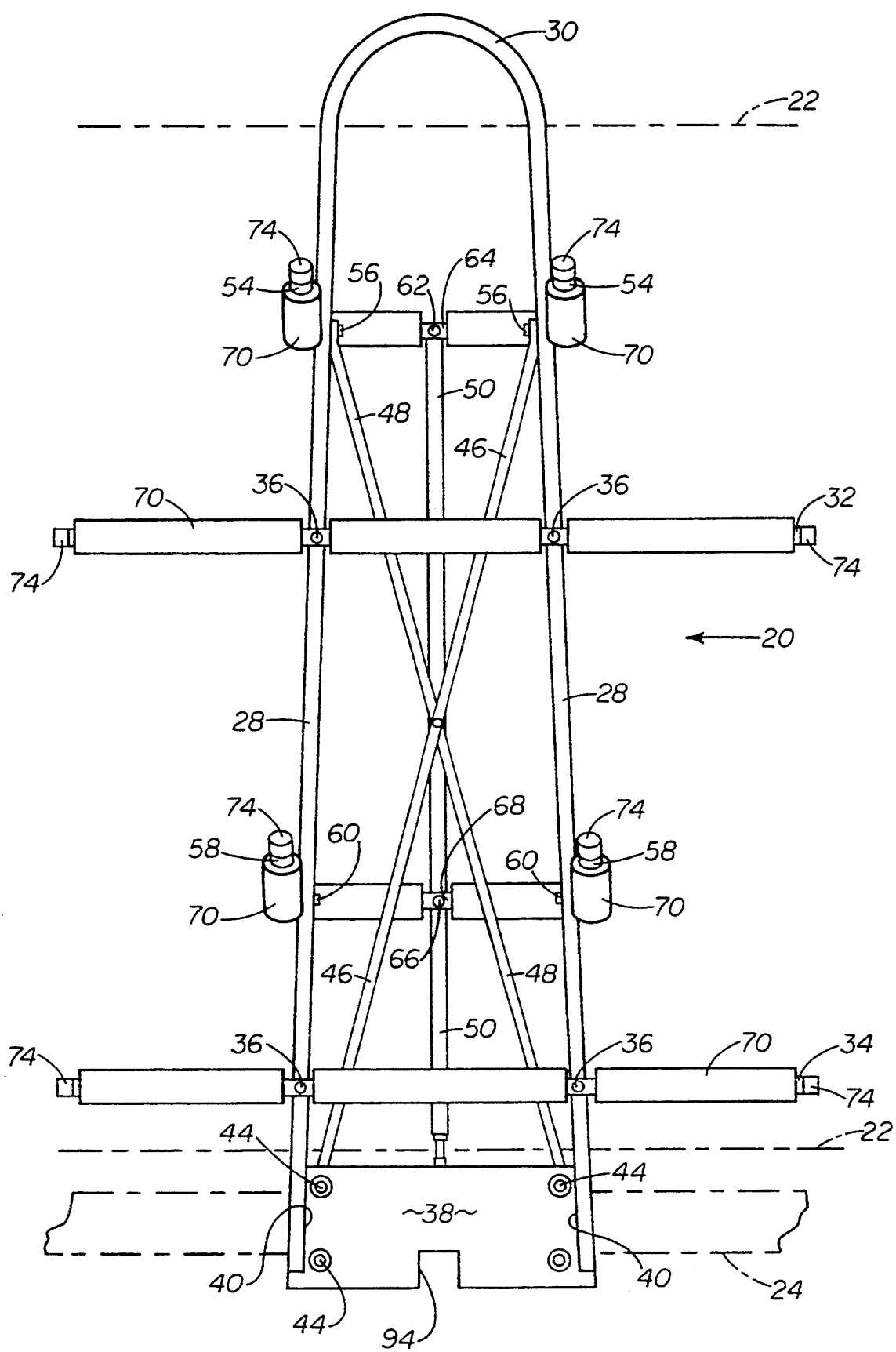
FIG. 1 is a rear elevational view of the multilevel bicycle rack.
Figure 2:
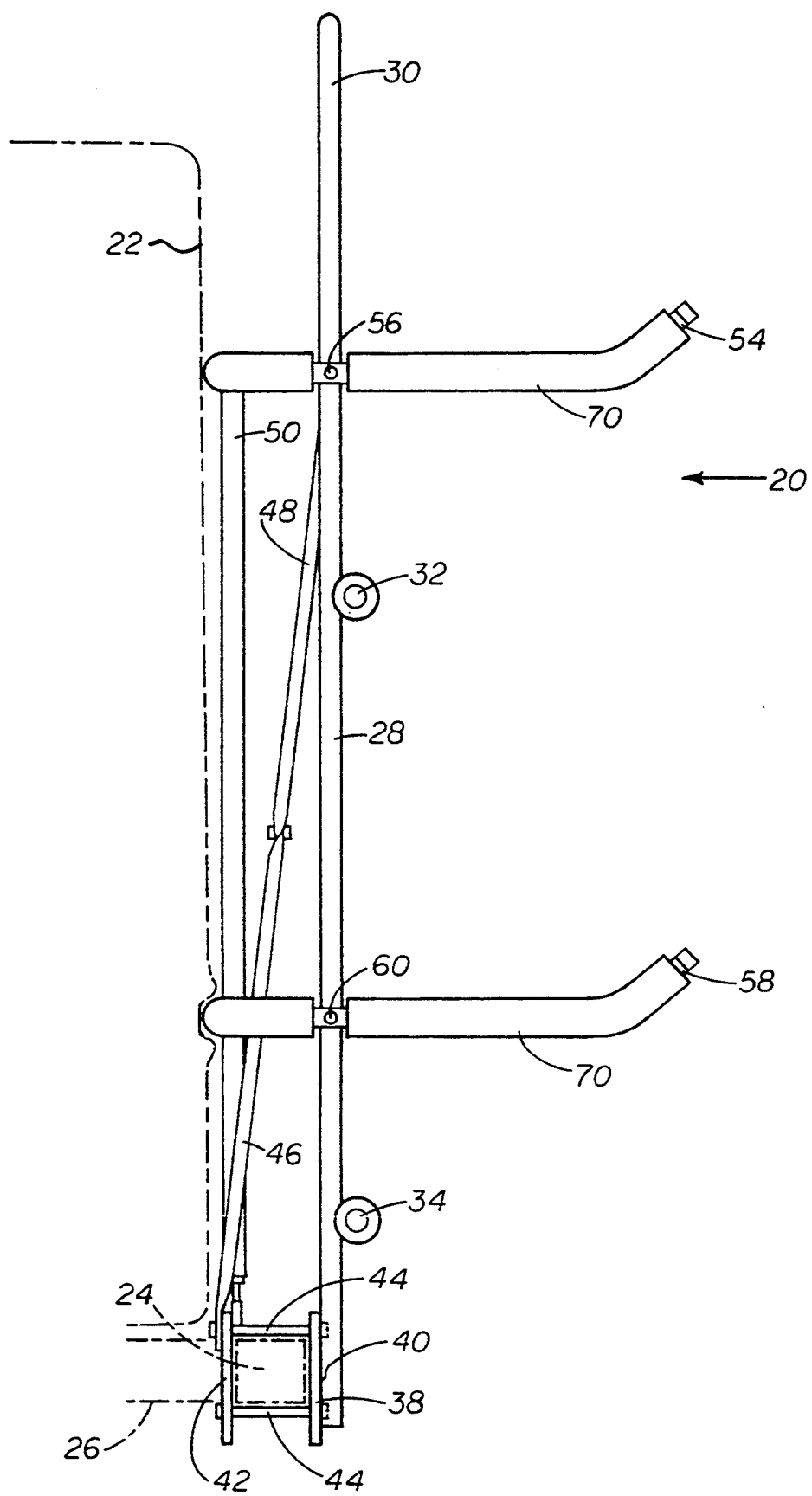
FIG. 2 is a left side view of the rack.

Illustrated in FIGS. 1, 2 and 5 is the multilevel bicycle rack generally denoted by 20 positioned on the rear end (shown ghosted) 22 of a full size travel trailer or motorhome. With the exception of a relatively sturdy steel box section rear bumper 24 and bumper supports 26 the travel trailer or motorhome 22 exterior is constructed of thin aluminum sheet offering little structural support for attachments.

The rack 20 comprises a pair of vertical support tubes 28 joined at the top by a semi-circular tube 30. The vertical tubes 28 and top tube 30 may be formed as a single continuous tube or in sections fitted and bolted together. A pair of upper 32 and lower 34 transverse cross bars are bolted at 36 to the vertical tubes 28.

At the bottom of the rack 20 a plate 38 is welded at 40 to the vertical tubes 28. The plate 38 abuts the rear of the bumper 24 and a second matching plate 42 abuts the front of the bumper 24. Four bolts 44 pass through the plates 38 and 42 to clamp the rack 20 to the bumper 24. The upper two bolts 44 also attach a pair of diagonal tubes 46 and 48 to plate 42 at the front of the bumper 24. A single center post 50 of tubing is attached to plate 42 at top center 52 with a screw adjustment 51.

As additionally shown in FIGS. 3 and 4, a pair of upper arms 54 are bolted at 56 to the vertical tubes 28 and a pair of lower arms 58 are bolted at 60 to the vertical tubes 28. The diagonal tubes 46 and 48 extend upwardly and are fastened with the bolts at 56 to the vertical tubes 28. The vertical center post 50 is bolted at 62 to the forward extension 64 of the upper arms 54 and bolted at 66 to the forward extension 68 of the lower arms 58. Thus, the cantilevered loading of bicycles or other cargo on the upper arms 54 and lower arms 58 is transmitted directly to the plate 42 by vertical post 50. The screw adjustment 51 permits the arms 54 and 58 to be leveled regardless of the loading of the vehicle to which the rack is attached.

Whether constructed of steel tubing or aluminum tubing the above arrangement of elements has proven to be extremely rigid both transversely and fore and aft. Surprisingly, thin aluminum or steel tubing can support six or more bicycles or a combination of bicycles and a gas fired grill. The applicant experimentally tested the first prototype by mounting on a very large travel trailer and traveling extensively in both peninsulas of Michigan with the rack fully loaded. It is important to note that no fore and aft attachment to the trailer above the bumper is required and therefore no damaging attachment to the trailer body need be made.

To improve the usefulness of the rack 20 several features and options are included. The transverse cross bars 32 and 34 and the arms 54 and 58 are covered with cloth covered foam padding tubes 70. The tubes 70 protect bicycles or other cargo from damage by the rack and cushion against road shocks during travel. They also add a colorful attractive feature to the rack 20, As best shown in FIGS. 3 and 4, the tubular padding is carried around as indicated by 70 on the forward extensions 64 and 68 of the upper arms 54 and 58 respectively. On the forward extensions 64 and 68 the tubular padding 70 serves to protect both the rack 20 and vehicle rear end 22 from any metal to metal contact and damage.

Figure 6:
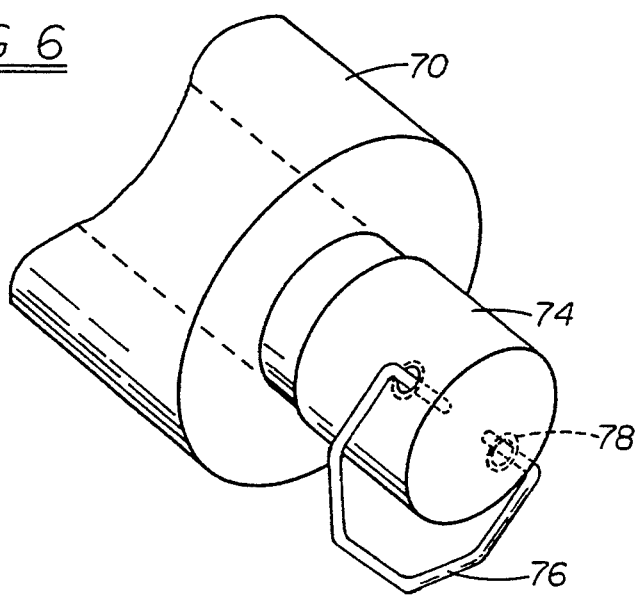
FIG. 6 is a detail in perspective of the end caps for the upper and lower arms.

As also shown in detail in FIG. 6, caps 74 and rings 76 are fastened at the ends of the transverse cross bars 32 and 34 and at the tips of the upper 54 and lower 56 arms. The rings fit into transverse holes 78 at the ends of the metal tubing to retain the caps 74 and rings 76. The rings 76 also serve as connections for straps, hooks, lines or other means to tie down the bicycles or other cargo.

Figure 7:
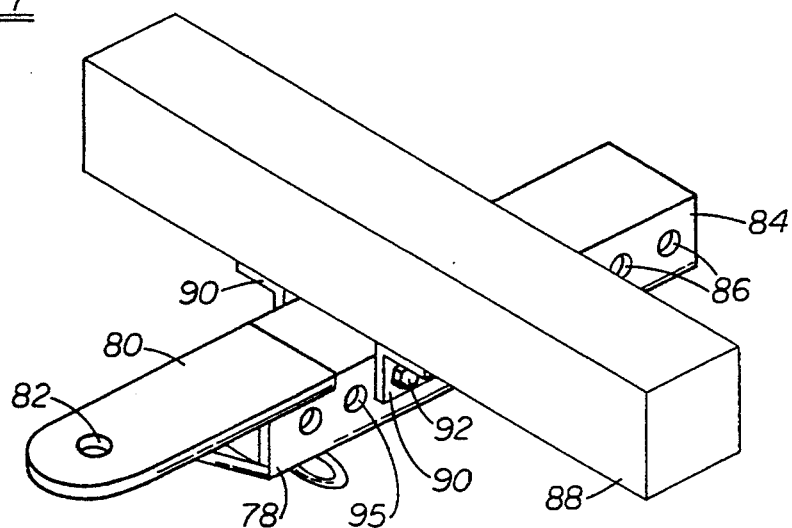
FIG. 7 is a detail in perspective of the alternative pseudo-bumper Class 3 hitch for the rack.

FIG. 7 illustrates the modification of a Class 3 hitch bar 78 to support the rack 20 on the back of a towing vehicle. The hitch bar 78 includes a thick steel tongue 80 with a hole 82 for a ball at one end. The other end 84 is sized to fit in the receiver on the vehicle and includes pin holes 86 therethrough. A pseudo-bumper 88 extends transversely to the hitch bar 78 and is fastened thereto either permanently by welding or as shown with brackets 90 and through bolts 92. A notch 94 is formed in the plates 38 and 42 to clear the hitch bar 78. With extra through holes 95 the pseudo-bumper 88 has some fore and aft adjustability. Thus, the rack 20 can be located between the towing vehicle and the tongue of a trailer. Or, with this option, the rack can be used on vehicles lacking a suitable bumper.

Figure 8:
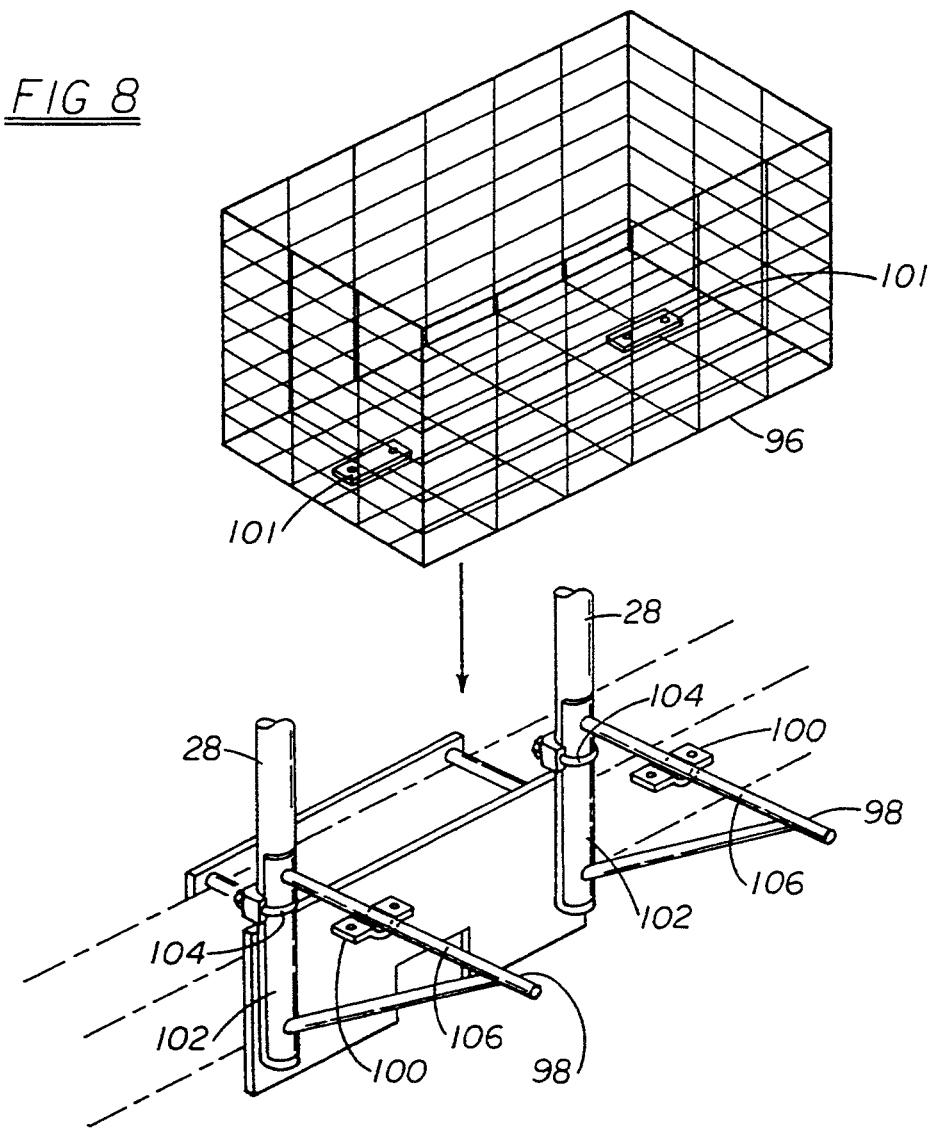
FIG. 8 is an exploded view of a wire basket carrier for the rack.

In FIG. 8 a wire cargo basket 96 option is illustrated. The cargo basket 96 is bolted on the underside to a pair of brackets 98 with clamps 100 and 101. The brackets 98 include vertical portions 102 that are semi-cylindrical to fit on the vertical support tubes 28. The brackets 98 are removably attached to the back of the tubes 28 with small U-bolts or muffler clamps 104 adjacent and just below the upper horizontal bars 106 of the brackets.

Figure 9:
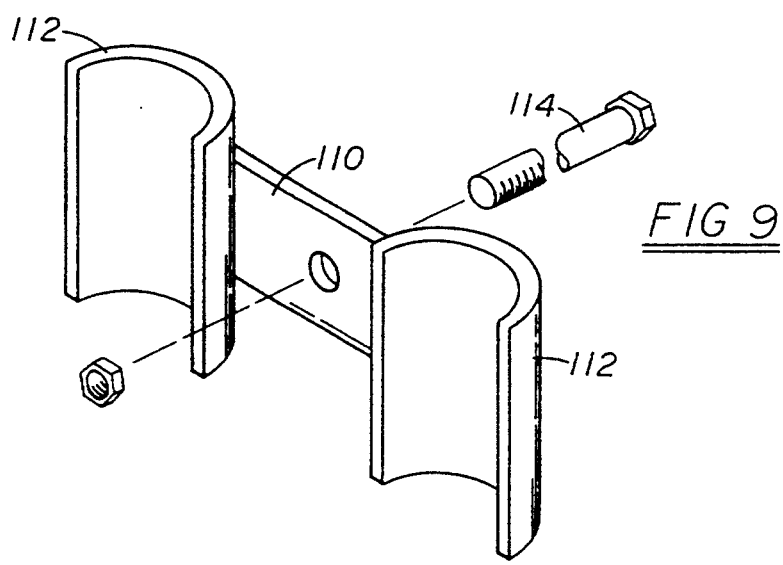
FIG. 9 is a perspective view of a tire carrier for the rack.

In a similar manner a tire mount generally denoted by 108 as shown in FIG. 9 can be fastened to the front of the vertical support tubes 28, the tire mount comprising a cross-bar 110 and two semi-cylindrical vertical portions 112. The semi-cylindrical vertical portions 112 may also be tightly fastened to the vertical support tubes 28 with U-bolts or muffler clamps as above. Other means of fastening such as bolts through the vertical support tubes may also be used. At the center of the cross-bar 110 is a bolt 114 for mounting the tire.

Figure 10:
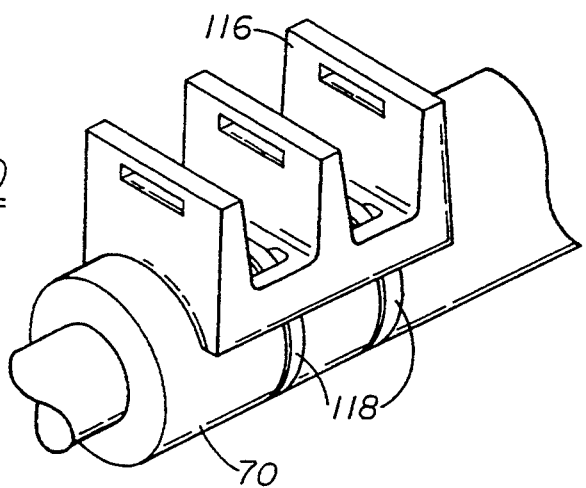
FIG. 10 is a perspective view of a strap for attaching a ski to an arm in vertical or horizontal position.

FIG. 10 illustrates an optional bracket 116 to attach snow skies to the arms 54 and 58 or the transverse cross bars 32 and 34. Thus, a pair of the brackets 116 can be attached in a variety of positions on the rack 20 with straps 118 wrapped about the padding 70. For example, the brackets 116 can be mounted one above the other on one of the upper 54 and one of the lower 58 arms or on the upper 32 and lower 34 transverse cross bars. Or the pair of brackets 116 can be mounted horizontally across either the pair of upper arms 54 or lower arms 58.

In summary, the rack 20 is a versatile device for carrying bicycles and all manner of cargo. The applicant has carried rubber inflatable boats on the rack and used the rack for towels, as a deer rack and for pull-up exercise bars. The tested prototypes are about eight feet in overall height and the arms extend rearwardly about two feet. The prototypes have been mounted on a five inch square steel bumper. The tubing comprises aluminum or steel thin walled structural tubing about one and one quarter inches in diameter and the plates 38 and 42 are about one quarter inches in thickness. The crossbars 32 and 34 extend a distance sufficient to secure the front wheel of an adult bicycle placed on the arms and thereby prevent movement and banging of the wheel against the back of the vehicle.

I claim:

1. A multilevel portable bicycle and cargo rack comprising at least one vertical support member having a top and a lower end and having means at the lower end thereof for attachment to a vehicle,
   a lower pair of load carrying arms spaced vertically above the lower end of the vertical support member and attached to the vertical support member,
   an upper pair of load carrying arms spaced vertically above the lower pair of load carrying arms and attached to the vertical support member, both the upper and lower pairs of load carrying arms extending aft relative to the rear of the vehicle,
   a vertical center post spaced forwardly of the vertical support member and having means at a lower end of the vertical center post for attachment to a vehicle,
   forward extensions of each pair of load carrying arms, said forward extensions being fastened to the vertical center post,
   and diagonal transverse bracing extending from attachment to the vertical support member near the top thereof to a lower attachment with the means for center post attachment to a vehicle, said lower attachment spaced forwardly from the vertical support member attachment means to a vehicle.

2. The multilevel portable rack of claim 1 including a transverse horizontal crossbar attached to the vertical support member and spaced below at least one pair of arms, said crossbar extending horizontally beyond the vertical support member a distance sufficient to exceed a front axle location of an adult bicycle carried on the pair of arms.

3. The multilevel portable rack of claim 1 wherein the means at the lower end for attachment to a vehicle comprise a pair of parallel plates adapted for placement fore and aft of a bumper, the forward attachment plate carrying the vertical center post and diagonal transverse bracing and the aft attachment plate carrying the vertical support member.

4. The multilevel portable rack of claim 1 wherein the vertical support member comprises a pair of spaced apart members, each spaced apart member carrying an upper and a lower arm and having a diagonal transverse brace attached thereto.

5. The multilevel portable rack of claim 1 including at least one aft extending bracket attachable to the vertical support member and cargo container means attached to the bracket.

6. The multilevel portable rack of claim 1 including a spare tire mount and means on the mount to attach the mount to the vertical support member.

7. The multilevel portable rack of claim 1 including a pair of ski mounting brackets attachable to a pair of the arms on the rack.

8. The multilevel portable rack of claim 1 including leveling adjustment means for the arms.

9. The multilevel portable rack of claim 8 wherein the leveling adjustment means are connected to the vertical center post to change the vertical height of the center post.

10. A multilevel portable bicycle and cargo rack for use on a vehicle having a rear comprising at least one vertical support member having a lower end and having means at the lower end thereof for attachment to the vehicle, a lower pair of load carrying arms adapted for supporting a first object, spaced vertically above the lower end of the vertical support member and attached to the vertical support member, an upper pair of load carrying arms adapted for supporting a separate second object, spaced vertically above the lower pair of load carrying arms and attached to the vertical support member, both the upper and lower pairs of load carrying arms extending aft relative to the rear of the vehicle, vertically extending means spaced horizontally from the vertical support member and having means at a lower end of the vertically extending means for attachment to a vehicle, said vertically extending means being attached to horizontally extending portions of the upper and lower arms, and means to diagonally and transversely brace the vertical support member, said diagonal brace means attached at one end thereof horizontally spaced from the vertical support member and attached at the other end thereof horizontally spaced from the vertically extending means.

11. A multi level portable bicycle and cargo rack for use on a vehicle having a rear comprising at least one vertical support member having a lower end and having means at the lower end thereof for attachment to the vehicle, a lower pair of load carrying arms adapted for supporting a first object, spaced vertically above the lower end of the vertical support member and attached to the vertical support member, an upper pair of load carrying arms adapted for supporting a separate second object, spaced vertically above the lower pair of load carrying arms and attached to the vertical support member, both the upper and lower pairs of load carrying arms extending aft relative to the rear of the vehicle, diagonal transverse bracing means extending generally vertically, said diagonal transverse bracing means attached at the lower end thereof to means for attachment to a vehicle and attached at the upper end thereof adjacent the upper pair of load carrying arms.

* * * * *